United States Patent [19]

Miyaoh

[11] Patent Number: 5,226,663
[45] Date of Patent: Jul. 13, 1993

[54] METAL LAMINATE GASKET WITH AUXILIARY SEALING BEAD

[75] Inventor: Yoshio Miyaoh, Tokyo, Japan

[73] Assignee: Ishikawa Gasket Co., Ltd., Tokyo, Japan

[21] Appl. No.: 895,752

[22] Filed: Jun. 9, 1992

[30] Foreign Application Priority Data

Jun. 13, 1991 [JP] Japan ................................ 3-44420[U]

[51] Int. Cl.⁵ .............................................. F16J 15/32
[52] U.S. Cl. .................................. 277/235 B; 277/236
[58] Field of Search ............... 277/235 B, 235 R, 236, 277/180

[56] References Cited

U.S. PATENT DOCUMENTS 4,739,999  4/1988  Ishii et al. .
4,776,601 10/1988  Yamada .
4,834,399  5/1989  Udagawa et al. ................ 277/235 B
5,092,613  3/1992  Udagawa ......................... 277/235 B

FOREIGN PATENT DOCUMENTS 0230804  8/1987  European Pat. Off. .
3926513  2/1990  Fed. Rep. of Germany .

Primary Examiner—William A. Cuchlinski, Jr.
Assistant Examiner—Daniel G. DePumpo
Attorney, Agent, or Firm—Kanesaka and Takeuchi

[57] ABSTRACT

The gasket of the invention is used for an internal combustion engine, and is basically formed of first, second and third plates for sealing around a hole of the engine. The first plate includes a curved portion to define the hole of the engine, and a flange extending from the curved portion. The second plate is located under a base portion of the first plate, and includes a hole larger than the flange. The third plate includes an inner portion, an outer portion and a bead situated between the inner and outer portions. The inner portion is located between the flange and the base portion, and the outer portion is located under the second plate. The bead extends through a space between the flange and the second plate, so that pressure applied to the bead is entirely directly supported by the plates under the inner portion and the outer portion. No distortion is formed on the plates by compression of the bead.

6 Claims, 1 Drawing Sheet

METAL LAMINATE GASKET WITH AUXILIARY SEALING BEAD

BACKGROUND OF THE INVENTION AND RELATED ART STATEMENT

The present invention relates to a metal laminate gasket with an auxiliary sealing bead extending toward an engine part to seal around a hole.

A metal laminate gasket for sealing between engine parts has been used widely, wherein a plurality of metal plates is laminated together. In one type of the metal laminate gaskets, such as Japanese Utility Model Publication (KOKOKU) No. 54-25532, one of outer plates is turned around the hole to be sealed and covers outside the hole so that fluid passing through the hole does not enter between the plates.

A cylinder head gasket G as shown in FIGS. 1 and 2 is this kind of gasket, which includes a plurality of cylinder bores Hc, water holes Hw, oil holes Ho and bolt holes Hb. The gasket G is formed of outer plates 10, 14, three middle plates 11, 12, 13 and a wire ring 15. The plate 10 includes a curved portion 10a and a flange 10b, and the plate 11 includes a bead 11a.

The outer plate 14 defines an underside of the gasket G, but an inner portion 14a of the outer plate 14 is located inside the flange 10b to prevent fluid or gas from entering between the plates of the gasket. The plate 13 with a large opening is situated above a main part of the plate 14 to adjust height of the gasket at the flange 10b and the main part of the plate 14. There is a lateral space 16 between the plate 13 and the flange, through which the plate 14 extends.

In this gasket G, a bead 14b is formed under the plate 13 to project outwardly or toward an engine part so that the bead 14b abuts against the engine part to prevent leakage of fluid through small dents or grooves on the engine part. This bead 14b is useful for sealing in case the engine part is made of hard material, such as iron.

However, since side portions of the bead 14b are located under the same plate, i.e. plate 13, and especially, one side of the bead 14b is located close to an inner edge of the plate 13, when the gasket G is compressed, the bead 14b causes undesirable force.

Namely, when the bead 14b is compressed, since the side of the bead close to the inner edge of the plate 13 is not firmly supported, the side of the bead is forced to move toward the cylinder bore Hc to thereby raise the flange 10b outwardly. Also, when the bead 11a is compressed, the same side of the bead 14b is pulled toward the cylinder bore, so that the bead 14b does not operate as intended. Further, the plate 14 may be partly twisted due to uneven force caused by the bead 14b.

The bead 14b abutting against the engine part is useful for sealing against the engine part. However, such bead 14b of the conventional gasket may cause undesirable force to cause leakage of the fluid.

Accordingly, one object of the invention is to provide a metal laminate gasket with an auxiliary sealing bead, which can seal properly around a hole without causing undesirable force against other parts of the gasket.

Another object of the invention is to provide a metal laminate gasket with an auxiliary sealing bead as stated above, wherein the auxiliary sealing bead can absorb movement of a part of a plate to eliminate distortion of the gasket.

A further object of the invention is to provide a metal laminate gasket as stated above, which can be easily and economically manufactured.

Further objects and advantages of the invention will be apparent from the following description of the invention.

SUMMARY OF THE INVENTION

In accordance with the present invention, the metal laminate gasket is installed in an internal combustion engine having a hole to be sealed. The gasket is basically formed of first, second and third metal plates piled together.

The first plate includes a first hole corresponding to the hole of the engine, a curved portion to define the first hole and a flange extending from the curved portion in a direction away from the first hole.

The second plate is situated under a base portion of the first plate and includes a second hole with an inner edge. The diameter of the second hole is larger than an outer diameter of the flange. When the first and second plates are assembled, the second plate does not overlap the flange and forms a space between the flange and the inner edge.

The third plate includes a third hole larger than the first hole but smaller than the second hole. The third plate further includes an inner portion around the third hole, an auxiliary bead outside the inner portion, and an outer portion outside the auxiliary bead. When the gasket is assembled, the inner portion is located between the flange and the base portion, and the outer portion is located outside or underside the second plate to form an outer plate of the gasket.

The auxiliary bead projects in a direction away from the first plate and extends from the inner portion to the outer portion through the space between the flange and the inner edge to allow the inner edge of the second plate to be located inside the bead. Accordingly, the auxiliary bead can properly seal around the hole of the engine without affecting to other parts of the gasket.

In the present invention, it is important that the inner edge of the second plate is located in a space of the auxiliary bead. Namely, one side of the bead, i.e. inner portion, is located above the flange of the first plate, while the other side of the bead, i.e. outer portion, is located under the second plate.

Therefore, when the auxiliary bead is compressed by tightening the gasket, the tightening pressure applied onto the auxiliary bead is properly transferred to a portion above the inner portion and the second plate. Undesirable force is not formed by the auxiliary bead, nor is applied to the flange or the gasket. Therefore, the inner portion does not move as in the conventional gasket, and the auxiliary bead operates as intended.

Preferably, the inner and outer portions of the third plate are vertically spaced apart from each other. Namely, since the inner portion is located above the flange when the gasket is assembled, the inner portion is formed to be located above the outer portion.

In the present invention, a coating or plating may be formed on an outer surface of the third plate to seal between the gasket and the engine part. The coating may be rubber or soft resin. A graphite sheet may be attached to the third plate.

The gasket of the invention further includes main sealing means situated between the flange and the base portion inside the auxiliary bead. The main sealing means primarily seals around the hole of the engine, and the auxiliary bead secondarily seals around the hole. The main sealing means may be a wire ring or a bead.

The gasket of the invention may further include one or more plates situated between the base portion of the first plate and the second plate.

DETAILED DESCRIPTION OF THE INVENTION

Figure 1:
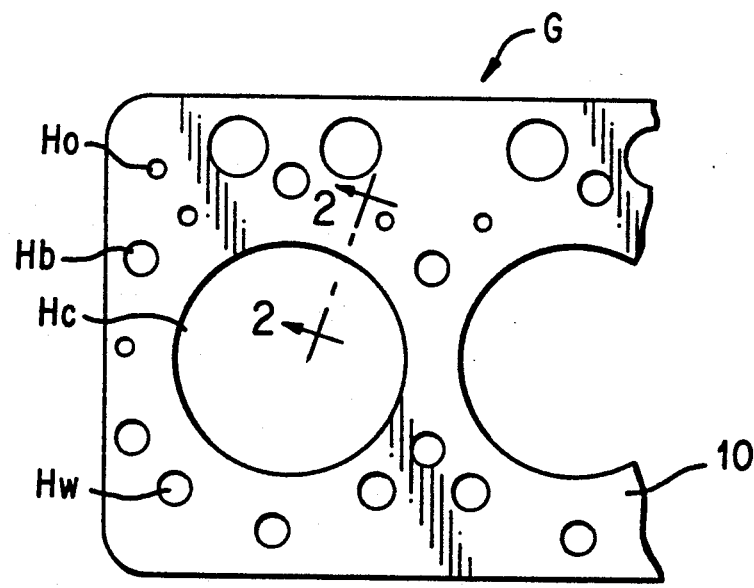
FIG. 1 is a plan view of a part of a conventional metal laminate gasket.
Figure 2:
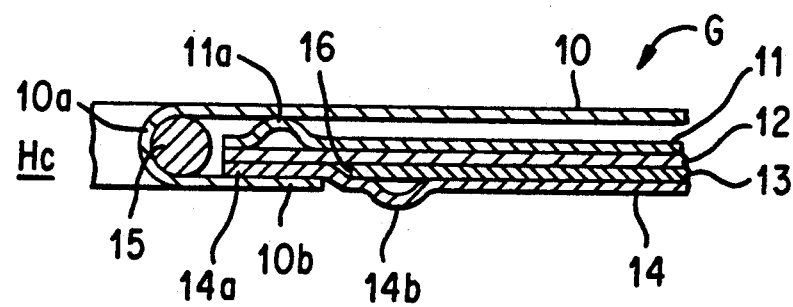
FIG. 2 is an enlarged section view taken along a line 2—2 in FIG. 1.

The gasket of the present invention is a cylinder head gasket and includes a plurality of cylinder bores Hc, water holes Hw, oil holes Ho, bolt holes Hb and so on, as in the conventional gasket shown in FIG. 1. The feature of the invention is applied to a sealing mechanism around the cylinder bore Hc as shown in FIG. 3.

The sealing mechanism of the invention, however, may be applied to other sealing mechanisms of the gasket. In the present invention, the sealing mechanism around the cylinder bore Hc is explained. Any sealing mechanisms may be used for sealing around the water holes Hw, oil holes Ho and so on.

Figure 3:
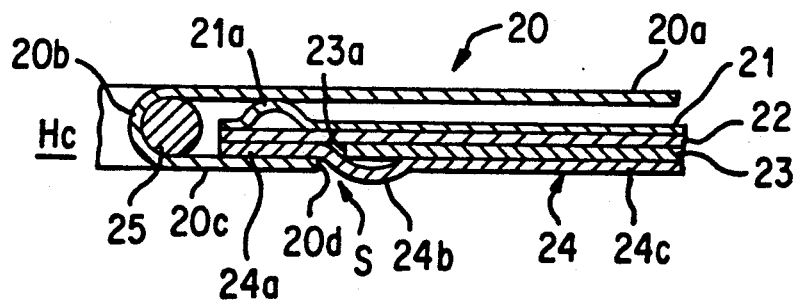
FIG. 3 is a section view, similar to FIG. 2, of the gasket of the present invention.

As shown in FIG. 3, the gasket of the invention is formed of an upper plate 20, three middle plates 21, 22, 23 and a lower plate 24, which extend substantially throughout the entire area of the engine. A wire ring 25 is situated around the cylinder bore Hc.

The upper plate 20 includes a base portion 20a abutting against an engine part, i.e. cylinder head, a curved portion 20b to define the cylinder bore Hc and a flange 20c situated under the base portion 20a. The middle plate 21 includes a bead 21a around the cylinder bore Hc.

The middle plate 22 is situated under the plate 21, which is formed to regulate the thickness of the gasket. The middle plate 23 is situated under the plate 22 and includes a hole larger than the cylinder bore Hc. A space S is formed between an inner edge 23a of the plate 23 and an outer edge 20d of the flange 20c. Therefore, the middle plate 23 does not overlap the flange 20c. The middle plate 23 operates to adjust a step or thickness formed by the flange 20c.

The lower plate 24 includes an inner portion 24a, a bead 24b and an outer portion 24c. The inner portion 24a is situated above the flange 20c, and the outer portion 24c is situated under the plate 23. The bead 24b extends from the inner portion 24a to the outer portion 24c through the space S and projects downwardly beyond the flange 20c.

In the gasket of the invention, it is important that the bead 24b is securely supported, especially at a side near the cylinder bore Hc. For this purpose, the inner portion 24a for supporting one side of the bead 24b is located between the flange 20c and the plate 22. The force applied to the inner portion 24a is directly and entirely applied to the plate 22. The outer portion 24c for supporting the other side of the bead 24b is located under the plate 23.

When the gasket is tightened between the cylinder head and the cylinder block (both not shown), the wire ring 25 and the bead 21a are compressed to securely seal around the cylinder bore Hc. Also, the bead 24b is compressed to subsidiarily seal around the cylinder bore Hc. The bead 24b is especially useful for sealing small dents or grooves formed on the cylinder block.

When the gasket is tightened, the force applied to the bead 24b is sufficiently transferred to the inner portion 24a and the outer portion 24c. Therefore, no special bias force is formed to move the inner portion 24a inwardly or toward the cylinder bore Hc, and the bead 24b is compressed to provide surface pressure against the cylinder block to properly seal around the cylinder bore.

In the gasket of the invention, it is important to provide the bead 24b, which extends through the space S between the inner edge 23a and the outer edge 20d. Therefore, when the bead 24b is compressed, no distortion is formed on the gasket.

Figure 4:
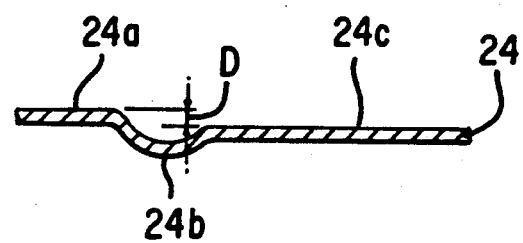
FIG. 4 is a side view of an outer plate used in the gasket of the invention.

When the gasket is assembled, the inner portion 24a is located above the flange 20c, while the outer portion 24c is located under the plate 23. Therefore, it is preferable to form the inner portion 24a vertically away from the outer portion 24c, as shown in FIG. 4. A distance D between the outer surfaces of the inner and outer portions 24a, 24c is equal to or greater than the thickness of the plate 23. As a result, the gasket can be easily assembled.

In the gasket of the invention, the bead is formed on the lower plate outside the flange so that the pressure applied to the bead is directly transferred to one of the plates for forming the gasket. Therefore, when the gasket is tightened, no special force is applied to the flange to cause distortion of the gasket. Also, the bead securely seals around the cylinder bore.

While the invention has been explained with reference to the specific embodiment of the invention, the explanation is illustrative, and the invention is limited only by the appended claims.

What is claimed is:

1. A metal laminate gasket for an internal combustion engine having at least one hole to be sealed, comprising, a first plate having a base portion extending substantially throughout an entire area of the engine, a first hole corresponding to the hole of the engine, a curved portion extending from the base portion to define the first hole, and a flange extending from the curved portion in a direction away from the first hole, main sealing means situated between the flange and the base portion to mainly seal around the first hole, a second plate situated under the base portion and having a second hole with an inner edge, the diameter of the second hole being larger than an outer diameter of the flange so that when the first and second plates are assembled, the second plate does not overlap the flange and the main sealing means and forms a space between the flange and the inner edge, and a third plate having a third hole larger than the first hole and smaller than the second hole, an inner portion situated around the third hole, an auxiliary bead situated outside the inner portion to surround the same, and an outer portion situated outside the auxiliary bead so that when the first, second and third plates are assembled, said inner protion is located between the flange and the base portion, said outer portion is located outside the second plate to form an outer plate of the gasket, and said auxiliary bead projects in a direction away from the first plate and extends from the inner portion to the outer portion through the space between the flange and the inner edge, said inner portion of the third plate being situated vertically away from and above the outer portion, a vertical distance between upper surfaces of the inner and outer portions of the third plate being at least equal to a thickness of the second plate, said inner edge of the second plate being located inside the bead without laminating the inner portion of the third plate so that the auxiliary bead smoothly and secondly seals around the hole of the engine without affecting to the flange when the gasket is tightened.

2. A metal laminate gasket according to claim 1, further comprising a fourth plate situated under the base portion of the first plate, said fourth plate having a fourth hole corresponding to the hole of the engine and a bead around the fourth hole to seal around the hole of the engine, said bead being located inside the auxiliary bead.

3. A metal laminate gasket according to claim 2, wherein said main sealing means is a wire ring situated adjacent to the curved portion so that the wire ring, the bead and the auxiliary bead are laterally spaced apart from each other and seal around the hole of the engine.

4. A metal laminate gasket for an internal combustion engine having at least one hole to be sealed, comprising, a first plate having a base portion extending substantially throughout an entire area of the engine, a first hole corresponding to the hole of the engine, a curved portion extending from the base portion to define the first hole, and a flange extending from the curved portion in a direction away from the first hole, main sealing means situated between the flange and the base portion to mainly seal around the first hole, a second plate situated under the base portion and having a second hole with an inner edge, the diameter of the second hole being larger than an outer diameter of the flagne so that when the first and second plates are assembled, the second plate does not overlap the flange and the main sealing means and forms a space between the flange and the inner edge, a third plate having a third hole larger than the first hole and smaller than the second hole, an inner portion situated around the third hole, an auxiliary bead situated outside the inner portion to surround the same, and an outer portion situated outside the auxiliary bead so that when the first, second and third plates are assembled, said inner portion is located between the flange and the base portion, said outer portion is located outside the second plate to form an outer plate of the gasket, and said auxiliary bead projects in a direciton away from the first plate and extends from the inner portion to the outer portion through the space between the flange and the inner edge, said inner portion of the third plate being situated vertically away from and above the outer portin, a vertical distance between upper surfaces of the inner and outer portions of the third plate being at least equal to a thickness of the second plate, and a fourth plate situated under the base portion of the first plate and above the second plate, said fourth plate having a fourth hole corresponding to the hole of the engine and an inner portion located around the fourth hole and above the inner portion of the third plate, said inner edge of the second plate being lcoated inside the bead without laminating the inner portions of the third and fourth plates and the flange so that when the gasket is teghtened, force applied to the inner portion of the third plate is directly applied to the inner portion of the fourth plate, and the auxiliary bead secondly seals around the hole of the engine without affecting the flange.

5. A metal laminate gasket according to claim 4, further comprising a fifth plate situated under the base portion of the first plate and above the fourth plate, said fifth plate having a fifth hole corresponding to the hole of the engine and a bead around the fifth hole to seal around the hole of the engine, said bead being located inside the auxiliary bead.

6. A metal laminate gasket according to claim 5, wherein said main sealing means is a wire ring situated adjacent to the curved portion without laminating the second to fifth plates so taht the wire ring, the bead and the auxiliary bead are laterally spaced apart frome ach otehr and seal around the hole of the engine.

* * * * *

UNITED STATES PATENT AND TRADEMARK OFFICE
CERTIFICATE OF CORRECTION

PATENT NO. : 5,226,663

DATED : July 13, 1993

INVENTOR(S) : Yoshio Miyaoh

It is certified that error appears in the above-identified patent and that said Letters Patent is hereby corrected as shown below:

Column 5, line 34, change "correpsonding" to --corresponding--; and line 39, change "betweenthe" to --between the--.

Column 6, line 18, change "portin" to --portion--;

line 38, change "correpsonding" to --corresponding--; and line 46, change "frome ach" to --from each--.

Signed and Sealed this

Eighth Day of February, 1994

Attest:

BRUCE LEHMAN

*Attesting Officer*      *Commissioner of Patents and Trademarks*